United States Patent
Hill et al.

(10) Patent No.: US 8,871,554 B2
(45) Date of Patent: Oct. 28, 2014

(54) METHOD FOR FABRICATING BUTT-COUPLED ELECTRO-ABSORPTIVE MODULATORS

(75) Inventors: Craig M. Hill, Warrenton, VA (US); Andrew T. S. Pomerene, Leesburg, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 813 days.

(21) Appl. No.: 12/523,801

(22) PCT Filed: Aug. 29, 2008

(86) PCT No.: PCT/US2008/074800
§ 371 (c)(1),
(2), (4) Date: Jan. 20, 2010

(87) PCT Pub. No.: WO2009/058470
PCT Pub. Date: May 7, 2009

(65) Prior Publication Data
US 2010/0330727 A1    Dec. 30, 2010

(51) Int. Cl.
*H01L 21/00* (2006.01)
*G02F 1/025* (2006.01)

(52) U.S. Cl.
CPC ..................... *G02F 1/025* (2013.01)
USPC ........................................................ 438/69

(58) Field of Classification Search
USPC .................. 438/69; 385/9; 359/315
See application file for complete search history.

(56) References Cited

U.S. PATENT DOCUMENTS

| | | | |
|---|---|---|---|
| 4,420,258 A | 12/1983 | Burns et al. | |
| 4,547,072 A | 10/1985 | Yoshida et al. | |
| 4,737,015 A | 4/1988 | Ishida et al. | |
| 4,748,617 A | 5/1988 | Drewlo | |
| 4,921,354 A | 5/1990 | SooHoo | |

(Continued)

FOREIGN PATENT DOCUMENTS

| | | |
|---|---|---|
| EP | 0 818 693 | 1/1998 |
| EP | 1 067 409 | 1/2001 |

(Continued)

OTHER PUBLICATIONS

Kimmet, J. S., "M.S. Thesis: Integrated Circuit Fabrication Details," Rutgers University, 1999; 18 pp.

(Continued)

*Primary Examiner* — Mark Tornow
(74) *Attorney, Agent, or Firm* — Antony P. Ng; Russell Ng PLLC

(57) ABSTRACT

A method for fabricating butt-coupled electro-absorptive modulators is disclosed. A butt-coupled electro-absorptive modulator with minimal dislocations in the electro-absorptive material is produced by adding a dielectric spacer for lining the coupling region before epitaxially growing the SiGe or other electro-absorptive material. It has been determined that during the SiGe growth, the current process has exposed single crystal silicon at the bottom of the hole and exposed amorphous silicon on the sides. SiGe growth on the amorphous silicon is expected to have more dislocations than single crystal silicon. There should also be dislocations or fissures where the SiGe growth from the each nucleation source finally join. Thus, a dielectric sidewall can protect an exposed waveguide face from any etching from an aggressive surface preparation prior to epi growth.

6 Claims, 5 Drawing Sheets

(56) References Cited

U.S. PATENT DOCUMENTS

| | | | |
|---|---|---|---|
| 5,165,001 A | 11/1992 | Takagi et al. | |
| 5,281,805 A | 1/1994 | Sauer | |
| 5,371,591 A | 12/1994 | Martin et al. | |
| 5,430,755 A | 7/1995 | Perlmutter | |
| 5,625,636 A | 4/1997 | Bryan et al. | |
| 5,674,778 A | 10/1997 | Lee et al. | |
| 5,703,989 A | 12/1997 | Khan et al. | |
| 5,736,461 A | 4/1998 | Berti et al. | |
| 5,828,476 A | 10/1998 | Bonebright et al. | |
| 5,834,800 A | 11/1998 | Jalali-Farahani et al. | |
| 6,117,771 A | 9/2000 | Murphy et al. | |
| 6,242,324 B1 | 6/2001 | Kub et al. | |
| 6,331,445 B1 | 12/2001 | Janz et al. | |
| 6,387,720 B1 | 5/2002 | Misheloff et al. | |
| 6,400,996 B1 | 6/2002 | Hoffberg et al. | |
| 6,477,285 B1 | 11/2002 | Shanley | |
| 6,605,809 B1 | 8/2003 | Engels et al. | |
| 6,677,655 B2 | 1/2004 | Fitzergald | |
| 6,680,495 B2 | 1/2004 | Fitzergald | |
| 6,738,546 B2 | 5/2004 | Deliwala | |
| 6,785,447 B2 | 8/2004 | Yoshimura et al. | |
| 6,795,622 B2 | 9/2004 | Forrest et al. | |
| 6,850,252 B1 | 2/2005 | Hoffberg | |
| 6,861,369 B2 | 3/2005 | Park | |
| 6,936,839 B2 | 8/2005 | Taylor | |
| 6,968,110 B2 | 11/2005 | Patel et al. | |
| 6,974,969 B2 | 12/2005 | Taylor | |
| 7,006,881 B1 | 2/2006 | Hoffberg et al. | |
| 7,010,208 B1 | 3/2006 | Gunn, III et al. | |
| 7,043,106 B2 | 5/2006 | West et al. | |
| 7,072,556 B1 | 7/2006 | Gunn, III et al. | |
| 7,082,247 B1 | 7/2006 | Gunn, III et al. | |
| 7,103,252 B2 | 9/2006 | Ide | |
| 7,139,448 B2 | 11/2006 | Jain et al. | |
| 7,215,845 B1 | 5/2007 | Chan et al. | |
| 7,218,809 B2 | 5/2007 | Zhou et al. | |
| 7,218,826 B1 | 5/2007 | Gunn, III et al. | |
| 7,259,031 B1 | 8/2007 | Dickinson et al. | |
| 7,272,279 B2 | 9/2007 | Ishikawa et al. | |
| 7,315,679 B2 | 1/2008 | Hochberg et al. | |
| 7,333,679 B2 | 2/2008 | Takahashi | |
| 7,348,230 B2 | 3/2008 | Matsuo et al. | |
| 7,356,221 B2 | 4/2008 | Chu et al. | |
| 2003/0026546 A1 | 2/2003 | Deliwala | |
| 2003/0183825 A1 | 10/2003 | Morse | |
| 2004/0121507 A1* | 6/2004 | Bude et al. | 438/93 |
| 2004/0146431 A1 | 7/2004 | Scherer et al. | |
| 2004/0190274 A1 | 9/2004 | Saito et al. | |
| 2005/0094914 A1 | 5/2005 | Gines et al. | |
| 2005/0094938 A1 | 5/2005 | Ghiron et al. | |
| 2006/0105509 A1 | 5/2006 | Zia et al. | |
| 2006/0158723 A1 | 7/2006 | Voigt et al. | |
| 2006/0238866 A1 | 10/2006 | Von Lerber | |
| 2006/0240667 A1 | 10/2006 | Matsuda et al. | |
| 2007/0116398 A1* | 5/2007 | Pan et al. | 385/2 |
| 2007/0202254 A1 | 8/2007 | Ganguli et al. | |
| 2008/0159751 A1 | 7/2008 | Matsui et al. | |
| 2008/0240180 A1 | 10/2008 | Matsui et al. | |

FOREIGN PATENT DOCUMENTS

| | | |
|---|---|---|
| WO | 9314514 | 7/1993 |
| WO | 0127669 | 4/2001 |
| WO | 0216986 | 2/2002 |
| WO | 2004088724 | 10/2004 |
| WO | 2007149055 | 12/2007 |

OTHER PUBLICATIONS

Pruessner et al., "InP-Based Optical Waveguide MEMS Switches with Evanescent Coupling Mechanism", Journal of Microelectromechanical Systems, vol. 14, No. 5, Oct. 2005.

May et al., "Integrated Process for Silicon Nitride Waveguide Fabrication", IBM Technical Disclosure Bulletin, vol. 33, No. 2, Jul. 1990.

Matsushita et al., "Narrow CoSi2 Line Formation on SiO2 by Focused Ion Beam", IEEE Xplore 1999.

"Process Integration", Cobalt Self-aligned Silicide Process, Chapter 13.

Liu et al., "Design of Monolithically Integrated GeSi Electro-absorption Modulators and Photodetectors on an SOI Plaform", Optics Express 623, vol. 15, No. 2, Jan. 22, 2007.

Fijol et al., "Fabrication of Silicon-on-insulator Adiabatic Tapers for Low Loss Optical Interconnection of Photonic Devices".

Yap et al., "Integrated Opteoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Kimberling et al., "Electronic-photonic Integrated Circuits on the CMOS Platform".

Chao et al., "Analysis of Temperature Profiles of Thermo-optic Waveguides", Fiber and Integrated Optics, vol. 33.

Okyay et al., "Silicon Germanium CMOS Optoelectronic Switching Device: Bringing Light to Latch", IEEE Transactions on Electron Devices, vol. 54, No. 12, Dec. 2007.

McAulay et al., "All-optical Switching and Logic with an Integrated Optic Microring Resonator", Proc. of SPIE vol. 5814.

Kik et al, "Erbium Doped Optical Waveguide Amplifiers on Silicon", MRS Bulletin 23(4), 48, Apr. 1998.

* cited by examiner

US 8,871,554 B2

METHOD FOR FABRICATING BUTT-COUPLED ELECTRO-ABSORPTIVE MODULATORS

STATEMENT OF GOVERNMENT INTEREST

The present invention was made with United States Government assistance under Contract No. HR0011-05-C-0027 awarded by Defense Advanced Research Projects Agency (DARPA). The United States Government has certain rights in the present invention.

PRIORITY CLAIM

The present application claims benefit of priority under 35 U.S.C. §365 to the previously filed international patent application number PCT/US08/74800 filed on Aug. 29, 2008, assigned to the assignee of the present application, and having a priority date of Oct. 30, 2007, based upon U.S. provisional patent application No. 61/001,161. The contents of both applications are incorporated herein by reference.

BACKGROUND OF THE INVENTION

1. Technical Field

The present invention relates to optical modulators in general, and in particular to a method for fabricating butt-coupled electro-absorptive modulators.

2. Description of Related Art

Silicon-based modulators are commonly employed in photonic integrated circuits. However, the indirect bandgap of silicon can prevent any electric field induced light modulation. Thus, devices having germanium grown on silicon wafers are becoming more popular because of the relatively small difference between the indirect and direct bandgaps of germanium, which can overcome some of the difficulties stemmed from silicon-based devices.

Proper device design and fabrication are very important in forming efficient germanium-silicon based modulators because there are many challenges in making workable germanium-silicon based modulators. Ideally, germanium-silicon based electro-absorptive modulators should have the lowest possible loss at a voltage-off state with the highest possible extinction ratio at a voltage-on state. Because germanium-silicon based electro-absorptive modulators inevitably have transmission loss due to the absorption of indirect band gap, the length of germanium-silicon active region has to be very short, typically less than 150 μm, in order to achieve low insertion loss at the voltage-off state. Therefore, it has to be coupled to a low-loss waveguide, such as a silicon waveguide, for on-chip applications. Since germanium-silicon based material system has a relatively high index contrast and its single mode dimension is very small (the single mode cut-off dimension is less than 1 μm), it is a big challenge to achieve an efficient waveguide-modulator coupling. Another problem is that standard reactive ion etching (RIE) of germanium-silicon based material usually results in rough sidewalls that increases the scattering loss in the germanium-silicon based electro-absorptive modulator.

Consequently, it would be desirable to provide an improved method for fabricating germanium-silicon based electro-absorptive modulators.

SUMMARY OF THE INVENTION

In accordance with a preferred embodiment of the present invention, a doped semiconductor layer is initially formed on a substrate. A first cladding layer is deposited on the doped semiconductor layer. A waveguide layer is then deposited and patterned to form waveguides. A second cladding layer is deposited on the waveguides. At least one trench is formed by etching through the second cladding layer, the waveguide layer, and the first cladding layer to expose the doped semiconductor layer. A film spacer layer is subsequently deposited on top of the trench. The film spacer layer is etched to form respective sidewalls within the trench. Finally, an electro-absorptive modulator is formed within the trench such that the electro-absorptive modulator is butt-coupled to the waveguides via the sidewalls.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
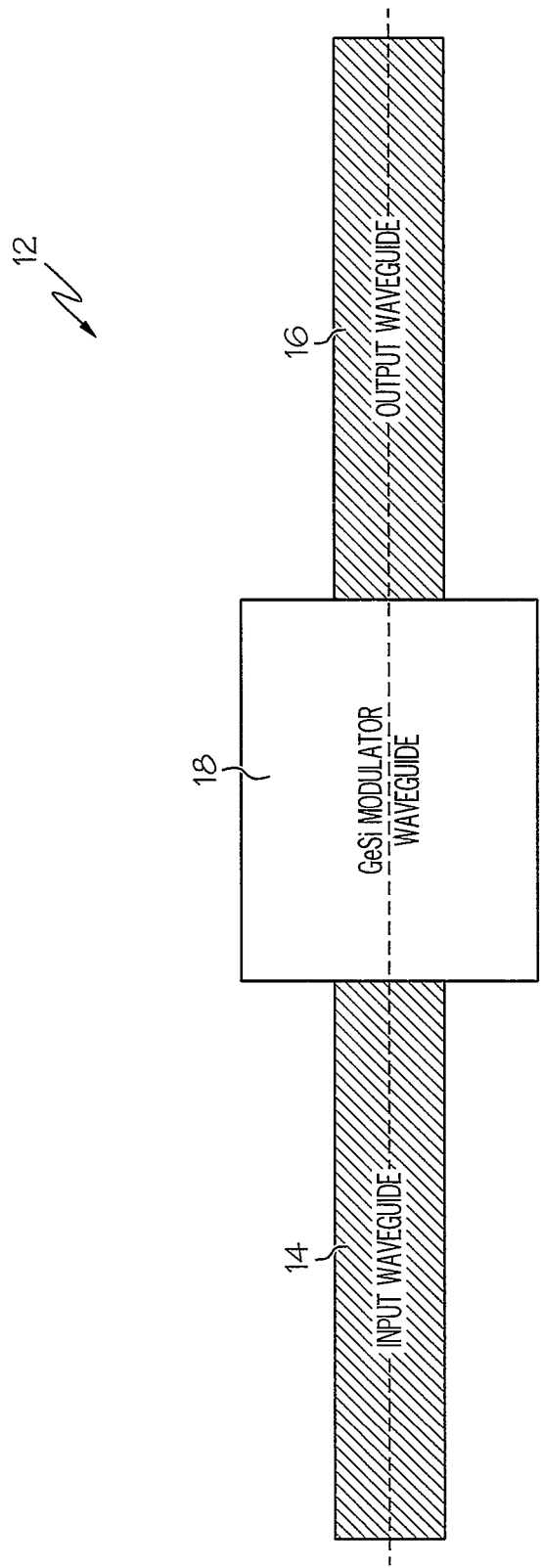
FIG. 1 is a high-level block diagram of a germanium-silicon based electro-absorptive optical modulator.

Referring now to the drawings and in particular to FIG. 1, there is illustrated a high-level block diagram of a germanium-silicon based electro-absorptive optical modulator. As shown, an optical modulator 12 includes an input waveguide 14, an output waveguide 16, and a modulator waveguide 18. Modulator waveguide 18 provides active light modulation between input waveguide 14 and output waveguide 16. Input waveguide 14 and output waveguide 16 are silicon (Si) waveguides. Modulator waveguide 18 can be made of germanium (Ge) or germanium-silicon (GeSi). The composition of the GeSi material is chosen such that the relative change in the absorption coefficient at a voltage-on state compared to a voltage-off state is maximized around the operating wavelength. The voltage-off state of modulator waveguide structure 18 is operated at a relatively low absorption regime of the GeSi material, and the length of modulator waveguide 18 is less than the order of ~150 μm so as to keep a low absorption loss at a voltage-off state. The voltage-on state is operated with a high electric field applied on the GeSi material to change its absorption coefficient in order to generate enough extinction ratio for light modulation at an voltage-on state.

Figure 2:
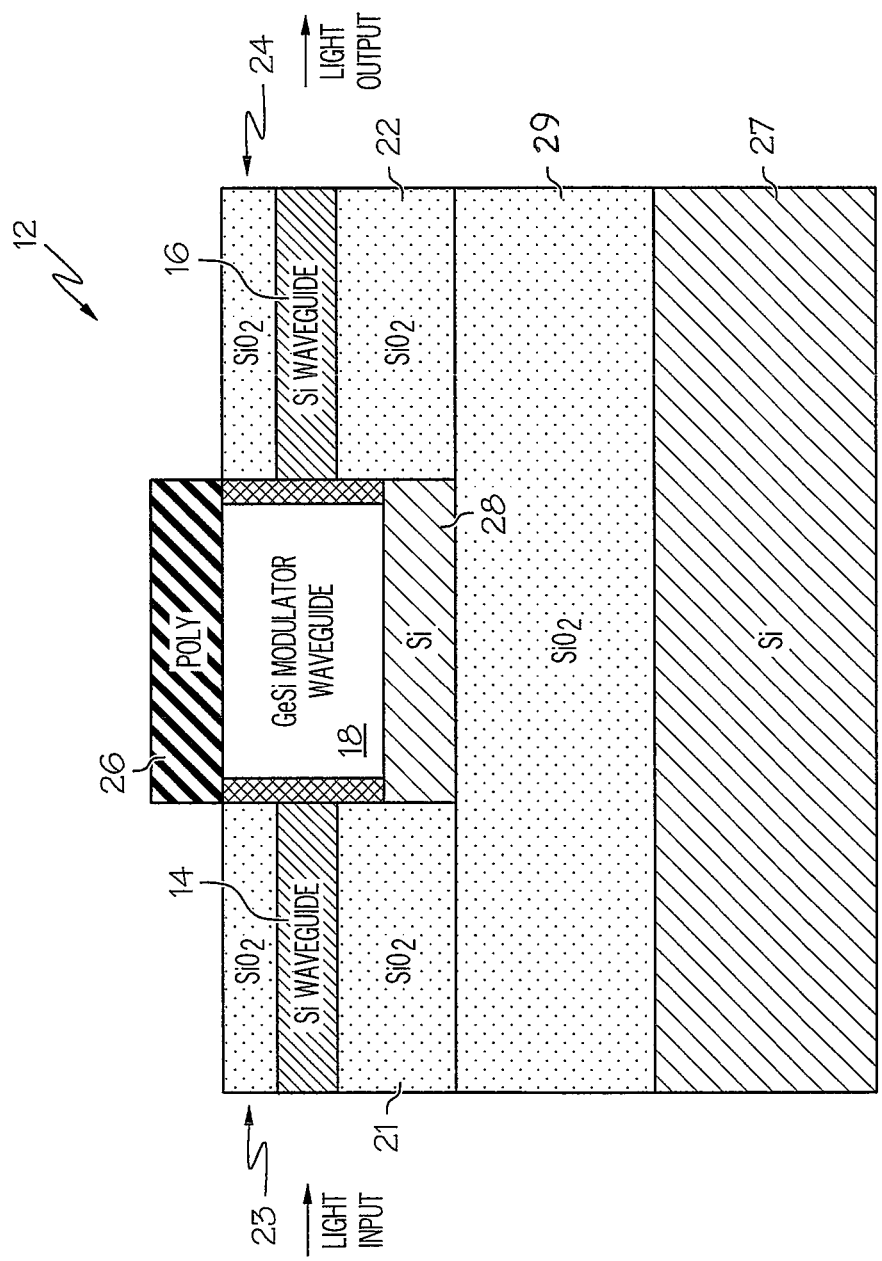
FIG. 2 is a detailed diagram of the germanium-silicon based electro-absorptive optical modulator from FIG. 1, in accordance with a preferred embodiment of the present invention.

With reference now to FIG. 2, there is illustrated a detailed diagram of optical modulator 12 from FIG. 1, in accordance with a preferred embodiment of the present invention. Optical modulator 12 includes a bottom Si substrate 27, an oxide insulator layer 29 and a silicon layer 28. Optical modulator 12 also includes modulator waveguide 18, a polysilicon layer 26 on top of modulator waveguide 18, input waveguide 14 and output waveguide 16 that are butt-coupled to modulator waveguide structure 18 via sidewalls 35a, 35b, and $SiO_2$ blocks 21, 22, 23, and 24. The thickness of oxide insulator layer 29 is approximately 2 μm, but it can be adjusted to other thicknesses as long as the light in waveguides 14, 16 and 18 does not leak to Si substrate 27.

Input waveguide 14 and output waveguide 16 are Si waveguides in the present embodiment; however, they can also be $SiO_xN_y$ or $SiN_x$ waveguides. $SiO_2$ blocks 21-24 can also be substituted by other dielectric materials such as $SiO_xN_y$ or $SiN_x$, as long as the refractive indexes of the materials in blocks 21-24 are smaller than the core material of input and output waveguides 14 and 16.

In addition, the same inventive optoelectronic device can also be used as a butt-coupled GeSi detector structure. The only difference is that the Si/GeSi/Si p-i-n diode waveguide structure in the photodetector device is usually longer than that in the modulator device in order to increase light absorption. At reverse bias, the electrons and holes excited by the absorbed photons are accelerated by the electric field applied on the GeSi layer through the Si/GeSi/Si p-i-n diode waveguide structure, and are collected by the electrodes. As such, optical signals are transformed into electrical signals for further processing in an electronic integrated circuit.

Figure 3A:
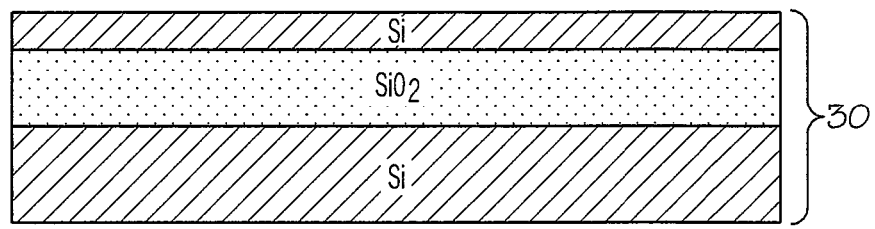
FIGS. 3a-3h are process flow diagrams of a method for fabricating the germanium-silicon based electro-absorptive optical modulator from FIG. 2, in accordance with a preferred embodiment of the present invention.
Figure 3B:
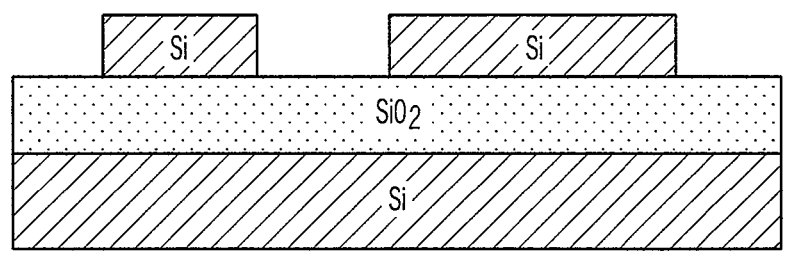
Figure 3C:
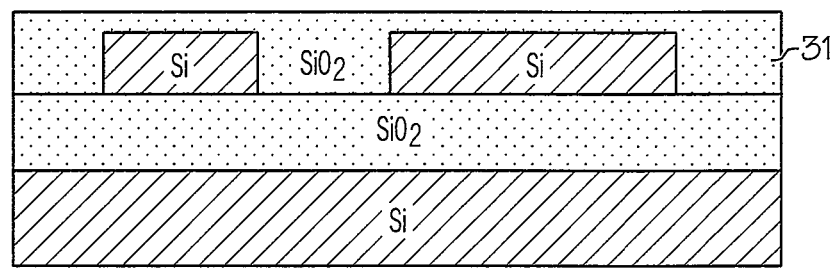

Referring now to FIGS. 3a-3h, there are illustrated successive steps of a method for fabricating optical modulators, such as optical modulator 12 from FIG. 2, on a silicon-on-insulator (SOI) wafer, in accordance with a preferred embodiment of the present invention. Initially, a SOI wafer 30 is provided, with the top Si layer doped p or n type, as shown in FIG. 3a. Si mesas are then formed by patterning the top Si layer on the $SiO_2$ insulator layer, as depicted in FIG. 3b. An oxide layer 31 is deposited on top of the structure and planarized by a chemical-mechanical polishing (CMP) process, as shown in FIG. 3c.

Figure 3D:
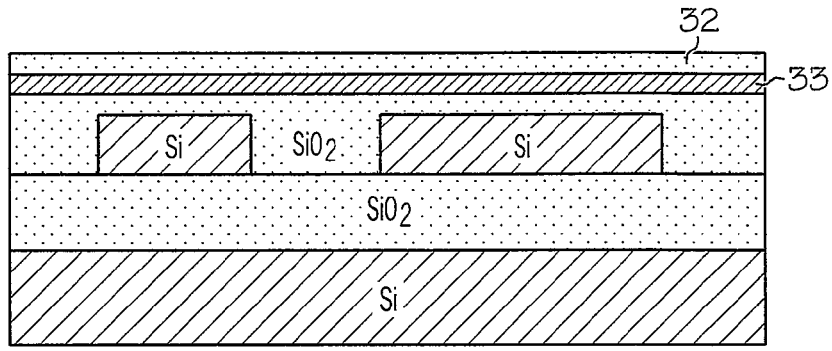

Next, a Si waveguide layer 33 is deposited and patterned (the patterning is into the page and is not shown). A $SiO_2$ layer 32 is then deposited on top to form the upper cladding of Si waveguide 33, followed by a CMP planarization, as depicted in FIG. 3d.

Figure 3E:
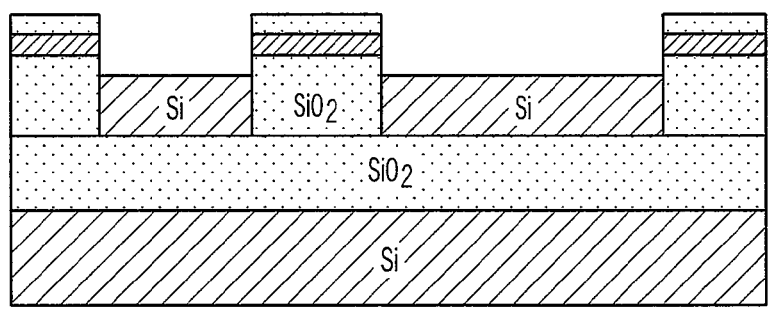
Figure 3F:
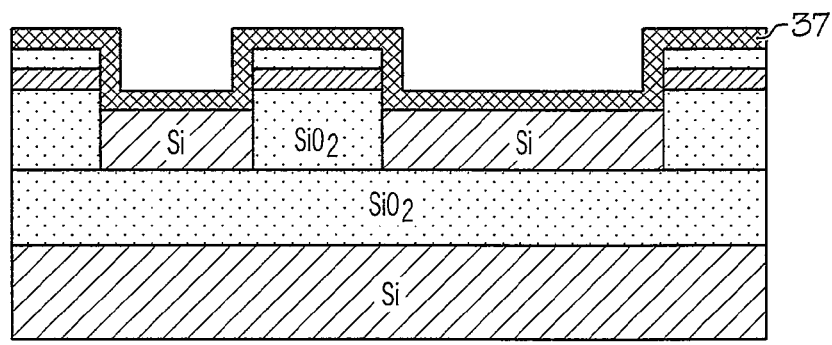
Figure 3G:
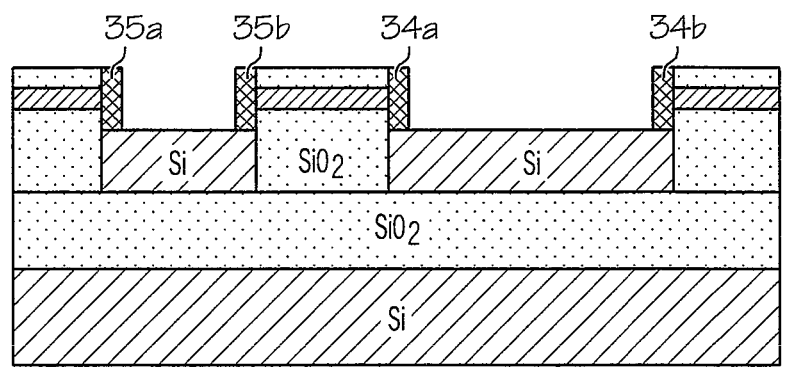

Trenches are subsequently etched into the structure to expose the tops of the Si mesas, as shown in FIG. 3e. A spacer film layer 37 of dielectric is deposited on top of the structure, as depicted in FIG. 3f. The dielectric can be $SiO_xN_y$ or $SiN_x$. Spacer film layer 37 is then etched back to form sidewalls 34a, 34b and 35a, 35b, as shown in FIG. 3g.

Optionally, in order to reduce deleterious effects caused by the trench etch shown in FIG. 3e, a dry etch is utilized to create a trench but an approximately 500 Å thick of oxide is left above the bottom silicon. Then, the spacer film deposition and etching are performed followed by an HF dip. This technique requires good depth control from the etch process.

Alternatively, oxide layer 31 is planarized, as shown in FIG. 3c, except less oxide (approximately 100-500 Å) is left on top of the first patterned Si layer. A thin layer of nitride (or other material, approximately 100-300 Å thick, that etches slower than oxide in HE) is deposited. More oxide is deposited to get the net desired thickness above the first patterned Si layer. Waveguide layer 33 are deposited and patterned, and $SiO_2$ layer 32 is deposited. Trenches are etched and stop on the underlying nitride. After the spacer deposition has been completed, spacer etch is performed to remove both the spacer nitride and the added nitride layer in the bottom of the hole. After the completion of a wet etch, Ge growth can be performed.

Figure 3H:
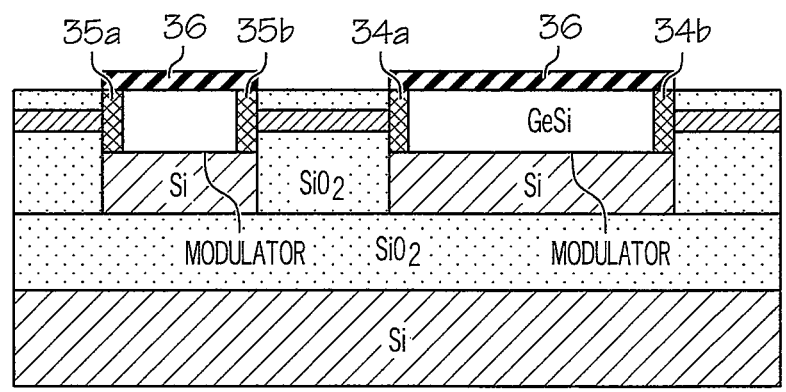

GeSi material is selectively grown into the trenches to form respective modulators, and the top is planarized by CMP. A silicon layer 36 with opposite type of doping to the Si mesas underneath GeSi waveguide structures is further deposited and patterned on top of the structure, as depicted in FIG. 3h. Metal electrodes (not shown) can be used to contact the doped silicon regions on tops and bottoms of the GeSi waveguide structures. As such, monolithic integration of waveguides and GeSi modulators can be achieved.

As has been described, the present invention provides an improved method for fabricating butt-coupled GeSi-based electro-absorptive modulators. The advantage of the added spacers or sidewalls is to prevent Ge defects that can create leakage and noise in the modulators. Ge defects, seems, or fissures are created when the Ge growth protrudes from the ends of the top waveguide as well as from the bottom Si surface. The spacers or sidewalls can prevent defects by inhibiting Ge growth from the ends of the top waveguides.

While the invention has been particularly shown and described with reference to a preferred embodiment, it will be understood by those skilled in the art that various changes in form and detail may be made therein without departing from the spirit and scope of the invention.

What is claimed is:

1. A method for fabricating an electro-absorptive modulator or detector, said method comprising:
   forming a doped semiconductor layer on a substrate;
   depositing a first cladding layer on said doped semiconductor layer;
   depositing and patterning a waveguide layer to form a plurality of waveguides;
   depositing a second cladding layer on top of said waveguide layer;
   etching a trench through said second cladding layer, said waveguide layer, and said first cladding layer to expose said doped semiconductor layer;
   depositing a film spacer layer on top of said second cladding layer to cover said trench;
   etching said film spacer layer to form respective sidewalls within said trench; and
   forming an electro-absorptive modulator within said trench such that said electro-absorptive modulator is butt-coupled to said waveguides via said sidewalls.

2. The method of claim 1, wherein said waveguide layer is made of silicon.

3. The method of claim 1, wherein said first and second cladding layers are made of $SiO_2$.

4. The method of claim 1, wherein said film spacer layer is a dielectric.

5. The method of claim 1, wherein said electro-absorptive modulator is made of Ge.

6. The method of claim 1, wherein said electro-absorptive modulator is made of GeSi.

\* \* \* \* \*